June 16, 1953 S. P. ALTMAN 2,641,925
SERVO LOADING STAND
Filed Oct. 3, 1950 3 Sheets-Sheet 1
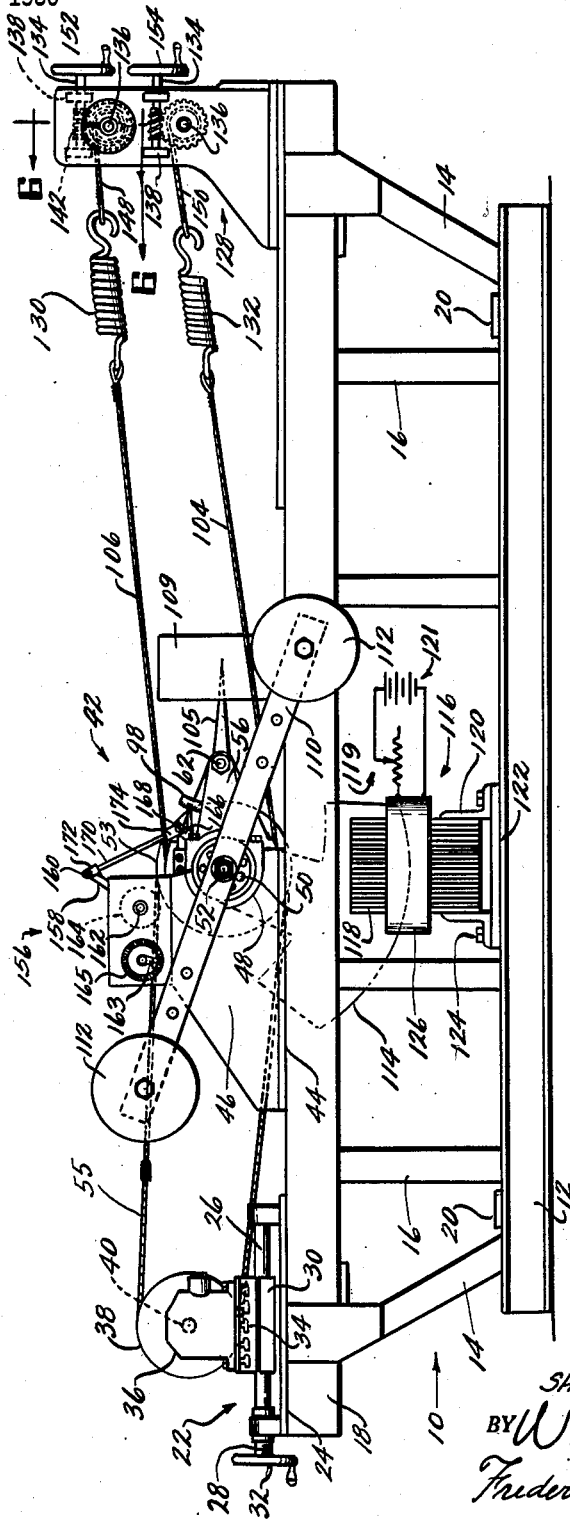
INVENTOR.
SAMUEL P. ALTMAN
BY Wade Komity
Frederick W. Cotterman
ATTORNEYS

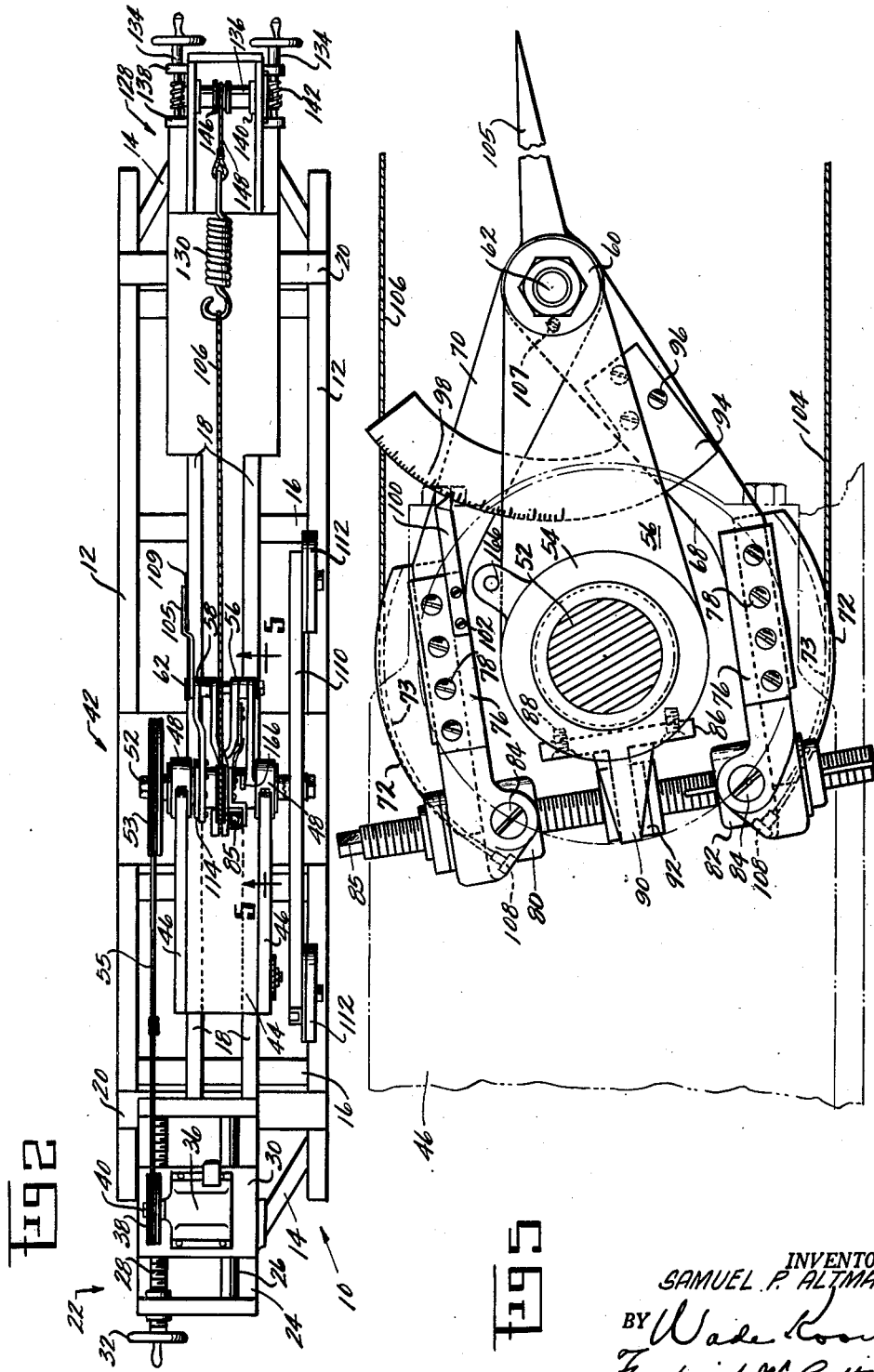

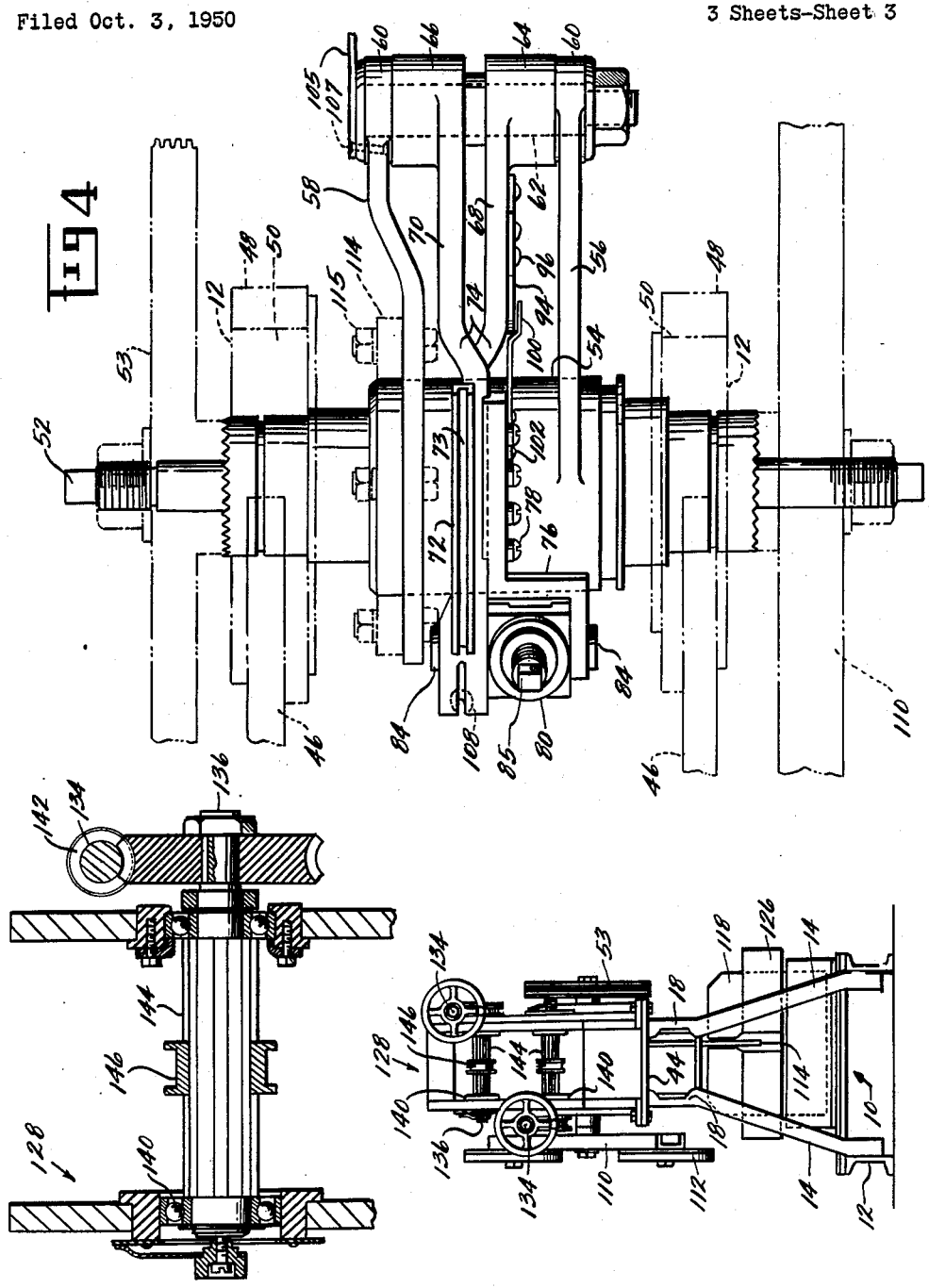

Patented June 16, 1953

2,641,925

UNITED STATES PATENT OFFICE 2,641,925

SERVO LOADING STAND

Samuel P. Altman, Dayton, Ohio

Application October 3, 1950, Serial No. 188,256

5 Claims. (Cl. 73—116)

(Granted under Title 35, U. S. Code (1952), sec. 266)

The invention described herein may be manufactured and used by or for the United States Government for governmental purposes without payment to me of any royalty thereon.

This invention relates to laboratory apparatus and has special reference to a stand for analyzing the dynamic performance of the servomotor of an automatic pilot under various load conditions which are imposed on the output shafts of the servomotors.

The apparatus is designed to subject the autopilot servomotor to inertia, spring, and damping loads which are the equivalent of those encountered in actual aircraft flight. Thus, once having determined the specific load conditions which will be encountered in a particular aircraft installation, the apparatus may be set to duplicate these conditions, whereby the dynamic performance of the servomotor may be observed by subjecting the servo, as it operates against its various loads, to a sinusoidal, step function, or any other form of input signal, and recordings of input and output made on oscillographs or other types of recorders. The apparatus is so designed that its loads may be varied over a considerable range so as to simulate the characteristics of many different types of aircraft.

In the drawings which illustrate one embodiment of the invention,

Fig. 1 is a side view of the assembled machine.

Fig. 2 is a top plan view of the mechanism shown in Fig. 1.

Fig. 3 is an end view of the device shown in Fig. 1 looking from the right toward the left.

Fig. 4 is an enlarged top plan view of the main loading shaft which appears to a smaller scale in Fig. 2.

Fig. 5 is an enlarged vertical section through the main loading shaft taken at 5—5 of Fig. 2.

Fig. 6 is an enlarged vertical section through the spring adjusting mechanism taken at 6—6 of Fig. 1.

In all of the foregoing views like reference characters refer to like parts.

In the drawings, a main frame 10 comprises two parallel base members 12 with diagonal end legs 14 and intermediate legs 16 extending upwardly from the base members to support the bed rails 18. Cross braces 20 prevent spread of the base members 12. The several instrumentalities for making the tests on the servomotors are mounted on the bed rails 18 and base members 12.

Supported on the left end of the bed rails 18 is the servo mounting carriage 22 which consists of a base plate 24 upturned at the ends to provide support for a rod 26 and a screw 28. A carriage platen 30 is slidable on the rod 26 and is internally threaded for the screw 28. A hand wheel 32 is affixed to the outer end of the screw 28 whereby the screw may be turned to move the platen 30 longitudinally on the machine. A plurality of T slots 34 (see Fig. 1) may be provided for the heads of bolts, whereby the servomotor 36 may be rigidly mounted on the platen 30. A servo output drum 38 is fast on the outer end of the servomotor shaft 40.

The body of the loading apparatus 42 is secured to the bed rails 18 at a point intermediate from the ends, and comprises a base plate 44 with side members 46 extending upwardly therefrom, and antifriction bearing cases 48 carried on the forward edges of the side plates.

Bearing cases 48 contain antifriction bearings 50 (see Fig. 1) which rotatably support the main loading shaft 52. Shaft 52 is shown to an enlarged scale in Figs. 4 and 5. A grooved pulley 53 is fastened to the outer end of the main loading shaft 52, and a cable 55 spans the servo output drum 38 and the pulley 53. Pulleys of different diameters may be substituted for the pulley 53. The tension in the cable 55 may be adjusted by means of the hand wheel 32.

In the space between the antifriction bearings 50, the shaft 52 has an elongated hub 54 (see Fig. 4) which has integral therewith two arms 56 and 58 extending more or less horizontally toward the right, the arms at the extreme right end being provided with short hubs 60 (see Fig. 4) through which a short shaft 62 extends.

Freely turnable on the short shaft 62 are longer hubs 64 and 66 (see Fig. 4) which are provided respectively with arms 68 and 70 which extend from their pivotal point toward the left. The left portion of the arms 68 and 70 are of arcuate contour on the outer edge 72 (see Fig. 5), the center of the arcs being at the center of the main loading shaft 52 when the internal flats of the Z shaped members 76 are parallel. The arms 68 and 70 are offset at 74, Fig. 4, so that the left half of the arms are one above the other in the same plane, arm 68 being below and arm 70 being above (see Figs. 4 and 5). These arcuate portions 72 and their grooves 73 constitute, in effect, a grooved pulley the diameter of which may be varied while the apparatus is in operation.

Z shaped members 76 are attached, one to the upper arm 70 and another to the lower arm 68, by screws 78 (see Figs. 4 and 5), whereby pockets are formed for the right and left hand nuts 80 and 82. Pivoting screws 84 extending through the arms 68 and 70 and through the Z shaped members into nuts 80 and 82 hold the nuts in place. A screw 85, having the upper end threaded left hand and the lower end threaded right hand, if turned clockwise, viewed from above, will decrease the average radius from the center of the main loading shaft to the surfaces 72 (see Fig. 5), while anticlockwise rotation of the screw will increase the average radius.

A bracket 86 (see Fig. 5) is fastened to the main loading shaft 52 by screws 88 and has a tongue 90 which extends into a groove in an enlarged part 92 of the screw 85, whereby rotation of the screw 85 always moves the arms 68 and 70 equal amounts in or out, and as long as the screw 85 remains nonrotative it prevents movement of the arms 68 or 70 toward or way from the axis of the loading shaft 52. An arcuate bracket 94 is fastened to the arm 68 by screws 96 whereby the average radius of the arcuate surfaces 72 from the center of the main loading shaft 52 may be read on the graduations 98 on the bracket. A pointer 100 for the graduation 98 is fastened to the member 76 by screws 102.

The outer convex surfaces 72 of the arms 68 and 70 (see Figs. 4 and 5) are grooved as at 73 for the cables 104 and 106, the rear ends of the cables being provided with cable-ends which are fitted to sockets 108 in the extreme left end of the arms 68 and 70. Pull on one or the other of the cables 106 or 104 rotates the loading shaft 52 clockwise or anticlockwise. A pointer 105 on the right hand end of the arm 58, rigidly fixed against rotation about the axis of the short shaft 62 by a pin 107 (see Fig. 5), corresponds with the graduations of chart 109 (see Figs. 1 and 2) to measure the degree of rotation.

By means of the above arrangement there is provided, for the purposes of this apparatus, the equivalent of an infinitely variable diameter pulley which can be varied in diameter while the test is progressing. The infinitely variable diameter pulley is adjustable to simulate a spring load.

A long bar 110 is mounted fast on the forward end of the main loading shaft 52 and is provided at its ends with weights 112 which are made in different sizes so that they can be changed to simulate different inertia loads.

A large aluminum segment 114 (see Figs. 1 and 4) is fastened to the side of the arm 58 by bolts 115 whereby the segment is turnable as one with the shaft 52. The lower end of the segment 114 swings freely in the air gap between the poles of an electromagnet 116 (see Fig. 1), thereby simulating a particular aircraft control surface damping load. A force proportional to the rate of motion through the air gap is obtained, due to eddy currents in the segment. The damping load can be varied by changing the amount of current energizing the electromagnetic coils.

The electromagnet 116 comprises a laminated core 118 held between angle brackets 120 which are fastened to a transverse plate 122 which rests on the base members 12, the angle brackets 120 and the plate 122 being fastened to the base member 12 by bolts 124. Two electromagnet windings 126 are wound around and secured to the poles of the core 118. A rheostat 119 controls the D. C. current from the source 121.

On the extreme right end of the bed rails 18 there is mounted a tail stock assembly 128 which carries a precision adjusting means for each of the springs 130 and 132. These adjusting means each comprise a worm shaft 134 and a worm wheel shaft 136 rotatable respectively in anti-friction bearings 138 and 140. Shaft 134 is provided with a worm thread 142 while shaft 136 is multiple splined as at 144, Fig. 3 or 6, for a small internally splined pulley 146. Pulley 146 is slidable axially on the shaft 136 for aligning itself with the cables 104 and 106. Short cables 148 and 150 have one end connected to springs 130 and 132 and the other ends to the surface of small pulleys 146, whereby the preload tension in springs 130 or 132 may be adjusted by rotation of the hand wheels 152 or 154.

A signal device 156, Fig. 1, is provided so that a D. C. or A. C. signal, proportional to and in phase with the displacement of the servo shaft 40, may be obtained for recording or indicator purposes.

An arm 158 having a pivotal point 160 at its outer end is fixed to the rotor shaft 162 of a synchro 164. The shaft of the synchro 164 is geared to contact wiper assembly 163 of the potentiometer 165. A lug 166 on the loading shaft 52 has its pivotal point 168 at the same radius from the axis of the loading shaft 52 as the pivotal point 160 of the arm 158 is distant from the axis 162 of the synchro.

A rod 170 has a clevis 172 at the upper end and another clevis 174 at the lower end for connecting the pivots 160 and 168 together. The pivotal points 160 and 168 at the ends of the rod 170 are as far apart as the axis of the synchro 164 is distant from the axis of the loading shaft 52.

Some of the advantages of the invention herein disclosed are as follows:

1. All loads are applied to the main loading shaft and adjusted before the auto pilot servo which is to be tested is itself placed under load.

2. The damping load is "viscous damping"; that is, the force is proportionate to the rate of angular displacement only for a given magnet coil current.

3. The effective spring constant can be changed without changing the spring itself by the use of the variable adjustment loading shaft, which may be done by providing an electric motor for turning the adjusting screw of the loading shaft in response to an electrical signal.

4. The damping load can be adjusted or changed during the test by proper electrical control of the current in the electromagnet.

The possibility of adjusting the several loads during the test is very important for aircraft with non-linear control surface loads.

Having described my invention, I claim:

1. Apparatus for testing servomotors which comprise in combination a frame, a servomotor mounting means adjustably mounted on the frame, a loading shaft mounted on said frame with is axis arranged so as to be parallel with the shaft of a servomotor on said mounting means, adjusting means associated with the servomotor mounting means for adjusting the distance between the servomotor shaft and the loading shaft, pulley and cable means connecting the shafts, means mounted on the loading shaft for applying a predetermined inertia load thereto, means operatively associated with the loading shaft for applying a predetermined viscous load thereto, further means connected to the loading shaft for applying a predetermined spring load thereto, means associated with the viscous load means for varying the viscous load while test is in progress and means cooperatively engaging the spring load means for varying the spring load means while the test is in progress.

2. Apparatus for testing servomotors which comprises in combination a frame, a servomotor mounting means on said frame, a loading shaft mounted on said frame with axis parallel with the shaft of the servomotor, means for adjusting the distance between said shafts, pulley and cable means connecting said shafts, means for applying a predetermined inertia load to said loading shaft, means for applying a predetermined viscous load to said loading shaft, means for applying a predetermined spring load to said loading shaft, and means for varying the viscous load and means for varying the spring load, both while said test is in progress, the means for applying a predetermined inertia load to the loading shaft consisting of a long bar fast at its midpoint to the end of said loading shaft and a selected pair of weights affixed one weight at each end of the bar.

3. Apparatus for testing servomotors which comprises in combination a frame, a servomotor mounting means on said frame, a loading shaft mounted on said frame with axis parallel with the shaft of the servomotor, means for adjusting the distance between said shafts, pulley and cable means connecting said shafts, means for applying a predetermined inertia load to said loading shaft, means for applying a predetermined viscous load to said loading shaft, means for applying a predetermined spring load to said loading shaft, and means for varying the viscous load and means for varying the spring load, both while said test is in progress, the means for applying a predetermined viscous load to the loading shaft comprising an electromagnet fast on said frame with spaced apart poles, and a segment concentric with the loading shaft axis and secured thereto and positioned thereon to extend into and rock between said poles thereby generating eddy currents which vary with the speed at which the segment rocks, and vary with the current in the electromagnet coils.

4. Apparatus for testing servomotors which comprises in combination a frame, a servomotor mounting means on said frame, a loading shaft mounted on said frame with axis parallel with the shaft of the servomotor, means for adjusting the distance between said shafts, pulley and cable means connecting said shafts, means for applying a predetermined inertia load to said loading shaft, means for applying a predetermined viscous load to said loading shaft, means for applying a predetermined spring load to said loading shaft, means for varying the viscous load and means for varying the spring load, both while said test is in progress, the means for applying a predetermined spring load to the loading shaft consisting of a pair of substantially parallel cables one spaced from the other in substantially the same plane, two small shafts spaced apart from and parallel to the loading shaft, a small pulley axially slidable on but drivably connected to each said small shaft, a split pulley on the loading shaft, the one cable passing clockwise partway around the one half of said split pulley and the other cable passing anticlockwise partway around the other half thereof, cable ends on said cables adapted to fit into sockets in the halves of said split pulley, one end of each cable being thereby operatively secured to the loading shaft, the opposite end being attached to the circumference of said small pulley, separate adjusting means for rotating said small pulleys to tauten said cables, an extension coil spring interposed within the length of each cable, and adjusting means to spread apart the one half of said split pulley from the other half.

5. The apparatus of claim 4 wherein the diameter of the split pulley on the loading shaft is adjustable while the apparatus is in operation.

SAMUEL P. ALTMAN.

References Cited in the file of this patent

UNITED STATES PATENTS

| Number | Name | Date |
|---|---|---|
| 1,052,302 | Armstrong | Feb. 4, 1913 |
| 1,541,083 | Walker | June 9, 1925 |

FOREIGN PATENTS

| Number | Country | Date |
|---|---|---|
| 326,651 | Great Britain | Mar. 20, 1930 |